United States Patent

[11] 3,581,147

[72] Inventor Lev Nickolaevich Korablev
Moscow, U.S.S.R.
[21] Appl. No. 660,326
[22] Filed Aug. 14, 1967
[45] Patented May 25, 1971
[73] Assignee Fizichesky Institute IM.P.N.
Lebedera, Moscow, U.S.S.R.

[54] ELECTRONIC PULSE COUNTER WITH BISTABLE SWITCHING ELEMENTS
13 Claims, 9 Drawing Figs.

[52] U.S. Cl. .......... 315/84.5, 328/48, 235/92
[51] Int. Cl. .......... H01j 17/36, H03k 21/32, H03k 23/18, H03k 23/28
[50] Field of Search .......... 328/48; 315/84.5, 84.6; 235/92

[56] References Cited
UNITED STATES PATENTS
2,669,390 2/1954 Manley .......... 315/84.5
2,758,250 8/1956 Ridler et al. .......... 315/84.5
2,887,590 5/1959 Warman .......... 315/84.5X
3,202,837 8/1965 Baracket .......... 328/48X
3,258,696 6/1966 Heymann .......... 328/48X

*Primary Examiner*—John Kominski
*Assistant Examiner*—V. Lafranchi
*Attorney*—Waters, Roditi, Schwartz & Nissen

ABSTRACT: Several different embodiments of the invention in the form of different pulse counters are disclosed involving the use of switching elements and particularly cold-cathode tubes in association with coincidence circuits to provide a pulse counter, there being particularly employed a one-way feedback circuit which has a reduced number of switching elements, smaller than the conversion factor and capacitance of the counter, the input of the first element or stage being directly connected to the counter input, and the combined outputs of at least two last elements or stages of the counter being connected by a unidirectional feedback circuit for returning the preceding elements or stages to the initial zero condition.

PATENTED MAY 25 1971

3,581,147

ELECTRONIC PULSE COUNTER WITH BISTABLE SWITCHING ELEMENTS

DRAWING

DETAILED DESCRIPTION

Figure 1:
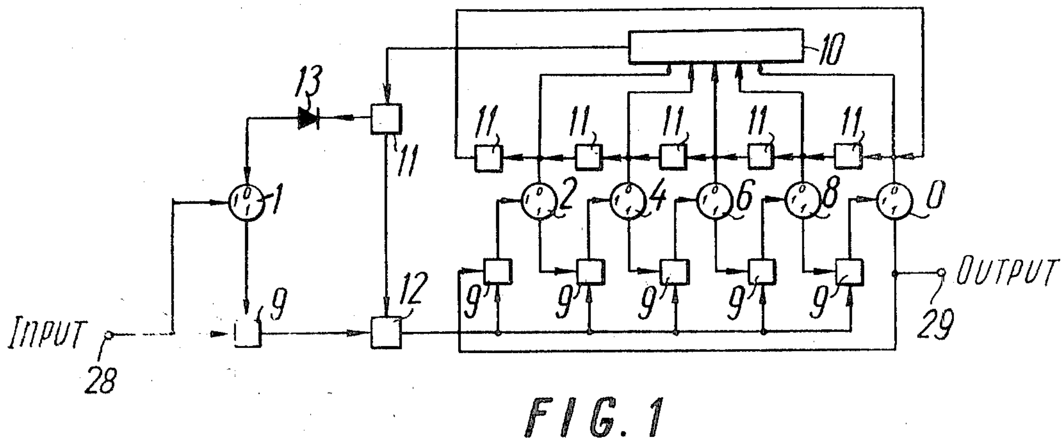
FIG. 1 is a logical block diagram of a six-stage decimal counter (decade) provided in accordance with one embodiment of the invention.

This invention relates to electronic pulse counters employed for counting, recording (storing) and summing a number of pulses and more particularly to counters of electric pulses which are designed on the basis of two-state switching elements, for example, cold-cathode tubes and are employed in computers and for automation as well as in time metering devices.

Ring and binary pulse counters are known which consist of stages connected in series. In ring counters, this series connection is provided by means of coincidence circuits connected between the stages and the input pulses to be controlled. Decimal counters of this ring-type include at least ten stages, the input forming stage being excluded.

Binary-decimal computers are known which are provided with eight switching elements per stage.

Said counters consist of a great number of switching elements and parts and therefore have no great reliability.

It is an object of the present invention to provide a simple and reliable counter consisting of a small number of elements.

It is another object of this invention to provide, in particular, a decimal hexadic counter for time metering devices which will have a minimum number of elements and parts and which affords a convenient time reading.

As switching elements, in these devices, can be employed gas discharge cold-cathode tubes having two steady states which provide for visual indication of the state of the counter by tube glow. Some other two-state switching elements can also be used such as, for example, semiconductor switching rectifiers.

According to the present invention, considerable simplification of counting circuits and reduction of the total number of elements are achieved by inserting additional logical couplings between nonadjacent stages. These couplings made it possible to design decimal counting circuits with as few as six and even five elements, i.e., they have allowed simplifying the counting decades substantially in spite of the fact that their logical circuits become more complex.

A distinctive feature of the proposed counters is the insertion of the following logical couplings:

a. Insertion of coincidence circuits between the counter stages except the first stage which is directly connected to the counter input and controls the following coincidence circuits;
b. Insertion of feedback couplings with one-way transmission of pulses from at least two stages which serve for returning the preceding stages to their initial position;
c. For improving the reliability of counter operation, a controlling feedback from the output to the input is inserted through which the output pulse of a reversed polarity provides from the combined output of a counting circuit an automatic control of duration of the initiating pulses according to the sensitivity of each stage.

This feedback coupling operates upon operation of a corresponding stage.

Such logical and adjusting couplings are employed in a six-stage decadc counter wherein one of the coincidence circuit is connected between the counter input and the inputs of all the following stages connected in the manner of a ring circuit, a one-way feedback to the first stage being provided by connecting a diode between the first stage and the following ones or by feeding the first stage from the combined load or output of the following stages.

In this counter, the initiating pulses are continuously fed to the first stage while to the following stage they are fed only after the operation of the first stage, and operation of any of the following stages will return the first stage in the initial state.

Another form of decade counter in accordance with the invention consists of five stages, the first stage of which is directly connected to the counter input, while the second and the third ones are connected through the coincidence circuits which are individually controlled by the preceding stages. The inputs of the fourth and fifth stages are connected to the output of the first stage through the coincidence circuits controlled by the third stage. The combined outputs of the fourth and fifth stages are unidirectionally connected either through load resistors, or through diodes to the zero inputs of the first and second stages as well as to the zero input of the third stage.

To provide hexadic conversion, for example, for time-metering devices, an embodiment involving a four-stage counter is illustrated. In this counter, the common input is directly connected to the inputs of the rest of the stages through the coincidence circuits which are controlled for the second stage by the first stage and for the third and fourth stages by the second stage. One-way feedback couplings for returning the stages to their initial state are provided by connecting the zero inputs for returning the first and second stages to their initial condition with the combined outputs of the third and fourth stages, and by connecting the zero input of the second stage to the outputs of the first, third and fourth stages, while the zero outputs and inputs of the third and fourth stages are respectively connected to each other.

All the foregoing counters, wherein cold-cathode tubes are employed in them, provide for a convenient visual indication of the counter states and a simple reading. This reading is carried out in accordance with the digits "O"—8" which may be designated on the tubes. These digits are illuminated by the luminescence of plasma when the corresponding tubes are operated.

Other objects of this invention will be more apparent upon consideration of the following description and accompanying drawings.

The following references are identical throughout all of the figures:

0, 1, 2, 3, 4, 5, 6, 8, are bistable switching elements (for example, cold-cathode tubes) forming triggering stages which have initiating inputs and zero inputs for returning the stages to their initial condition and these reference numbers themselves are simultaneously used for counter readings;

9 are logical coincidence circuits;

10 are conditional combining collecting circuits formed in real counter circuits by combining, for example, the anodes of the tubes by means of a bus bar;

11 are conditional inverters of circuits for returning the stages of their initial condition, formed in real counters, for example, by a combination of tubes and elements 17, 18, 19, 22 and 26;

12 is an input pulse automatic control device;

13 is a one-way feedback;

14 is a diode in the one-way feedback circuit;
15 is a shunting cathode capacitor;
16 are diodes in the coincidence circuit;
17 is the first stage anode resistor;
18 is the terminal-stages anode resistor;
19 are the cathode resistors;
20 are grid resistors;
21 are grid capacitors;
22 are cathode capacitors;
23 is the input capacitor;
24 is the capacitor in the input pulse control circuit;
25 are additional grid resistors;
26 is the third stage anode resistor.
27 is a resistor;
28 is a binary trigger input terminal;
29 is an output terminal.

Figure 2:
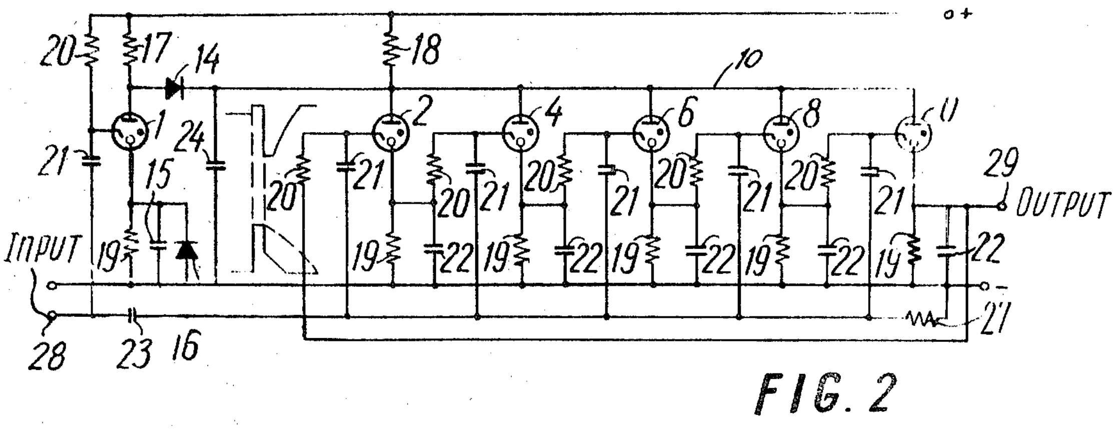
FIG. 2 is an electric circuit diagram of the six-stage decimal counter of FIG. 1.

The decade of FIGS. 1 and 2 comprises a binary trigger supplying a binary trigger input signal to tube 1, the first stage, and to a quintuple counting ring employing tubes 2, 4, 6, 8 and 0. A distinctive feature of this six-tube decade is the return of the first stage or tube 1 to its initial condition by means of a one-way nonlinear feedback 13 established from the anode bus bar 10 of the ring employing tubes 2, 4, 6, 8 and 0 to the anode of tube 1 through a conditional inverter 11. This bus bar 10 using high-resistance diodes 13 is provided so that, when tube 1 operates, the tube of the ring which is firing cannot be extinguished, but when the next tube of the ring is ignited, tube 1 which has been ignited by the first trigger pulse is extinguished. Another distinctive feature of the decade is a self-control of the input pulse by all the ring tubes in turn. This refers to variations in the duration of the pulse supplied in FIGS. 1—3 to tube 2,4,...,0 (except 1).

Tube 1 is permanently ready to be ignited by each successive input pulse and due to the initial discharge in this tube and self-stabilization of its grid voltage when discharged, tube 1 has a higher sensitivity than all of the tubes of the quintuple ring. Transmission of the initiating pulse to the ring tubes is hampered due to second diode 16 if tube 1 is not ignited.

If in the initial condition (i.e., with tube 1 nonconducting), for example, tube 0 fires, then tube 1 will operate from the first input pulse. After this, the voltage appearing at the cathode of tube 1 cuts off diode 16. As a result of this, the initiating pulse is passed to the next tubes.

The operation of any ring tube upon a reception of the next pulse results in extinguishing tube 1 through open diode 14. But the ignition of tube 1 does not result in extinguishing the following tubes due to the unilateral conductivity of diode 14.

Tubes 2, 4, 6, 8 and 0 in turn prepare each other to operate from the initiating pulses along the ring.

On igniting tube 1, the second pulse fed to the decade input will not be shunted by diode 16 as the latter is cut off at this time. Therefore, tube 2 being prepared for operation by tube 0 operates from the second pulse and extinguishes tube 1 through diode 14. Tube 1 will be ignited again by the third pulse and will fire together with tube 2 until the next pulse is received. This latter pulse will ignite tube 4 which will extinguish all other tubes.

This cycle is repeated so that tube 1 operates only from the odd pulses while the ring tubes operate in succession from all of the even pulses.

Figure 3:
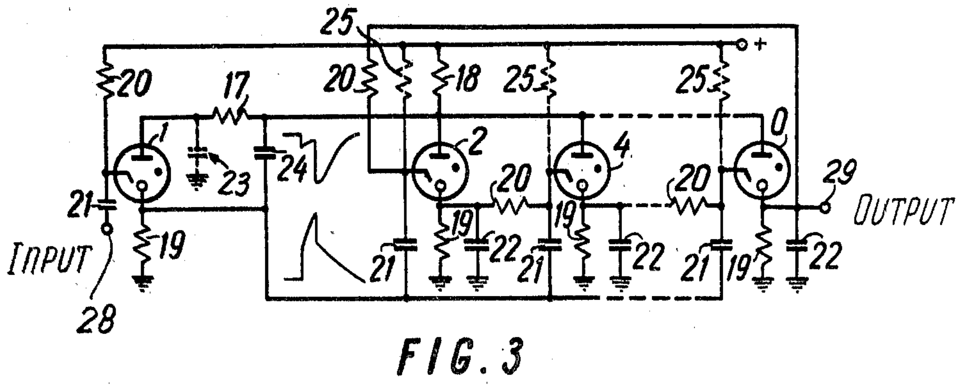
FIG. 3 is an electric circuit diagram with a self-control depending on input pulses and employing an input forming stage.

Reading is carried out either according to numbers on the firing tubes or a unit is added to these digits when tube 1 is ignited. In order that diode 14 should not cause an early and spontaneous extinction of tube 1, it should be cut off when the latter fires. To accomplish this, its anode voltage should be somewhat decreased compared to that of the other tubes. This condition is provided by selecting the corresponding values of both anode resistors 17 and 18 in the circuit (as shown in FIG. 2). At first, after the first tube is ignited, the anode current of the following tubes is somewhat decreased because at this moment anode resistor 17 of the first tube is disconnected. This decrease of the anode current, which depends on the relationship of both anode resistors 17 and 18, may result in breaking the discharge in the following tubes. To prevent the following tubes from being extinguished, their anode current is determined by appropriately calculating the values of cathode and anode resistors 17, 18 and 19. These values should be calculated so that, at the moment of current fall, its minimum value should not reach the falling portion of the current-voltage characteristic. In the circuit of FIG. 3, diode 14 may be excluded by connecting anode resistor 17 to the circuit instead of this diode. The circuit becomes more simple but the values of resistors 18 and 19 should be decreased several times and this results in the increase of current consumption.

In the electric circuit diagrams of FIGS. 2, 3, 5, 6 and 9 the logical elements 9 (binary coincidence circuits) are formed, for instance, by elements 20 and 21 coupled to the grid of the corresponding tube 3, 4, 5, 6, 8 or 0. Elements 10 and 11 are formed, for instance, by connecting the anodes of the corresponding tubes, this combination of anodes providing for the function of element 10 as a collecting circuit and a resetting of the tubes to initial state by extinguishing a tube when an adjacent tube is ignited. Element 12 is formed, for instance, by capacitors 24 coupling the output of the tubes to their input bus bar. Other types of elements 9, 10, 11 and 12 are also possible. For instance, element 9 can be formed as diode gates coupled in accordance with the block diagrams of FIGS. 1, 4, 8. In particular, in FIG. 1 element 9 coupled to output of tube 1, is formed in the circuit of FIG. 2 by elements 1 6, 23, 27. The switching bistable tubes 0, 1, 2, 3, 4, 5, 6, 8 provide two states—ON and OFF (ignited or not ignited, or conducting or nonconducting). They have two inputs—a triggering input (igniting) and an extinguishing input (cutting off) or a zero input, the triggering input using the tube grid, while the extinguishing input is normally the anode to which is applied the extinguishing pulse from the adjacent tubes. In the initial state the tubes are nonconducting (cut off, extinguished).

The proposed pulse feedbacks are used for two purposes: first to extinguish the foregoing stages following the triggering of the subsequent stages. These feedbacks have to be unidirectional (unilateral) to avoid extinguishing the subsequent stages following the triggering of the foregoing stages. With this object in view, a diode is connected in the feedback circuit. Second, the pulse feedback is used for extinguishing in the circuit of FIG. 3 of the first tube used to shape the triggering pulse for the subsequent counting valves. In the circuits of FIGS. 2 and 3 the pulse feedback is used to shape the duration of this triggering pulse by chopping it with capacitor 24, following the triggering of the subsequent tube. The first tube in FIG. 3 is extinguished immediately following the triggering of the subsequent tube 2,4 or 0, since the said tube is fed through resistor 17 from their anode bus bar.

In the counting decade (as shown in FIG. 2), tubes 2, 4, 6, 8 and 0 form a quintuple ring counting circuit wherein the preparation of the tube next-in-turn for operation is carried out by the voltage produced at cathode resistor 19 of each firing tube. When the preparing voltage fed through resistors 20 to the grids coincidence with the initiating pulse fed through grid capacitors 21, the voltage at the grid of the tube which is next-in-turn should exceed the dynamic voltage of ignition. Thus the succession of tube operation is provided by summing up the initiating pulse and the voltage fed from the cathodes of the preceding tubes through resistor 20 to the grids.

The initiating pulse at the grids of all the tubes but the next-in-turn one should have an amplitude and duration less than the dynamic voltage of ignition between the grid and the cathode. Therefore it should not cause the ignition of those tubes the initial bias voltage of which is zero. If one of the ring tubes fires, a bias voltage different from zero is passed from its cathode to the next tube grid. The value of this positive voltage should also not exceed the tube ignition grid voltage. This may be achieved by changing the anode voltage.

At the moment of transmitting the next initiating pulse it is summed up with the bias voltage and, if the sum exceeds the ignition grid voltage of the next-in-turn tube, the tube will then operate.

The tube extinction is provided by means of a pulse produced at common resistor 18 when charging cathode capacitor 22 of the operated tube.

Operation of the described ring circuits depends greatly on the stability of tube ignition voltage, and the value of its spread from tube to tube. The supply voltage value is still more critical, as its change sharply changes, in the same direction, both the the bias value and the amplitude of the initiating pulses which are usually transmitted from the tubes fed with the same voltage.

The circuit operation can be considerably improved by introducing an initiating pulse self-control.

For this purpose, in the ring counter (FIG. 2) is employed a reverse voltage pulse produced in the grid circuit of the next tube at the moment when it operates. At this moment the grid voltage sharply drops, from the voltage exceeding the ignition voltage to the firing voltage. If the internal resistance of the initiating pulse source is artificially increased which is achieved in the circuit by connecting additional intermediate capacitor 23, common to all the tubes, to the input circuit, then as soon as the ring tube next-in-turn operates, the initiating pulse amplitude will be sharply decreased due to the reverse reaction of the tube grid. Therefore, the other tubes will have no time to operate from this initiating pulse even if its amplitude was great and exceeded the ignition voltage of the other tubes.

If the sensitivity of the immediate tube is somewhat less, then the duration of the initiating pulse is automatically increased as shown with a dotted line in the waveform (FIG. 2). This method of providing self-control is effective when using tubes with a considerable difference between the grid ignition voltage and the grid firing voltage.

Operation of the ring circuit (FIG. 2) can be improved by employing the negative pulse produced at the anode bus bar when igniting the tubes. To accomplish this the input grid bus bar of tubes 2, 4, 6, 8 and 0 is connected to the anode bus bar of capacitor 24. This feedback considerably increases the compensating pulse. It is possible to replace capacitors 23 or 24 by resistors.

All of this self-control system is effective only in case the required reserve of the amplitude and the duration of the controlled initiating pulses is provided, as capacitors 23 and 24 form a divider which decreases the amplitude of all the pulses transmitted to the circuit input. In view of this fact, the circuit (FIG. 2) requires initiating pulses with a great amplitude.

In FIG. 3 is shown a circuit of greater sensitivity wherein the feedback embraces an external input shaping cold-cathode tube. This tube shapes an initiating pulse and controls its duration at the inputs of tubes 2, 4, 6, 8 and 0.

In order to provide self-control in the circuit of FIG. 3, the anode circuit of the first tube 1 is connected through resistor 17 to the anode bus bar of the counter so that the anode voltage at the first tube drops immediately after the operation of the next tube of the counter. Besides, the stage is shunted with capacitor 24.

In the circuit of FIG. 3, the first tube is fed with a somewhat lower voltage supplied from the combined anodes of tubes 2, 4, 6, 8 and 0. To make the first tube responsive to the initiating pulse voltages fed to the first tube, the anode voltage of the first tube may be increased.

Self-control of the initiating pulses may be provided in the counter itself by subtracting from the initiating pulse the extinguishing pulse produced when igniting the next tube of the counter. For this purpose, dropping resistor 18 should be inserted into the cathode circuit of the counter tubes. As a result of this, the pulse between the grids and cathodes of the counter tubes acts only during the time which lasts form the beginning of the initiating pulse to the ignition of the next tube of the counter.

On connecting the tubes of FIG. 3, their operating conditions become considerably easier as the extinction of the tubes is provided by an external pulse transmitted from the counter. Due to this operation, it is possible to increase the frequency of operation of the whole circuit, as load cathode resistor 19 of the input shaping tubes may be decreased compared to the case when there is no external extinction of the tubes.

The operation speed of the counter itself may be improved with an excitation of an initial preparatory weak-current discharge in the prepared tubes as well as with a decrease of the preparatory time of the immediate tube compared to the recovery time of the grid voltage after tube extinction.

The preparatory time is mainly determined by the time constant of the RC-circuit comprising grid resistor 20 and grid capacitor 21; in this case the recovery time also depending on the parameters of this circuit should exceed the deionization time of the anode-grid gap of each of the tubes.

Both these time intervals depending on the parameters of resistor 20 and capacitor 21 may be made different if the value of resistor 20 is increased up to some tens of megohms with a corresponding decrease of the capacitance of capacitor 21 in such a manner that the time constant of RC-circuit 20-21 be less than the deionization time. At adequately high values of resistors 20, a breakdown from the grid to the anode is avoided since the voltage between these electrodes is automatically controlled by both the low current discharge in steady conditions and the deionization current in the process of voltage recovery at the grid. The deionization current delays the recovery time of the grid voltage and increases this time up to the required value for each tube even if the time constant of RC-circuit 20—21 is small. With adequately great values of resistors 20, it is possible to provide for the operation with an initiating silent discharge in the prepared tube without its premature operation. In this case, one of the limitations concerning the change of the supply voltage towards its increase is avoided.

To eliminate possible relaxations, the capacitance of capacitor 21 is considerably decreased. Small capacitance value provides the quick operation required and facilitates the formation of an input pulse transducer decreasing the time constant of its load.

To increase the sensitivity of the ring tubes and the initial voltage at the grids, it is possible to feed them with a portion of the supply voltage. To accomplish this, it is necessary to connect additional resistor 25 between the anode bus bar and the grid of each tube, the values of these resistors being several times greater than that of resistor 20. The connection of these resistors to the circuit as shown with the dotted lines in the circuit diagram of FIG. 3, considerably extends the range of possible changes of the supply voltage, increases the tube operation speed, decreases the requirements as to the tube breakdown voltage and makes for exciting the initiating silent discharge in the prepared tube. It is especially useful to connect additional grid resistors 25 to all the circuits described at small amplitudes of the initiating pulses.

Self-control of the initiating pulses according to the sensitivity of each counter of the stage together with self-control of the grid voltage recovery rate by means of the deionization current substantially increases the counter operation speed and, what is most important, it provides a considerably extension of the operating range of the supply voltages characterizing the reliability.

Both these methods can be employed in other ring counters and also in the counters described below.

Further decrease of the number of tubes in decade counters is achieved by complicating the logic of tube connections between each other. Due to wide commutating possibilities and a variety of useful properties of the cold cathode tubes, complication of the logical circuit does not increase, but rather reduces the number of parts, thus simplifying the decade.

Figure 4:
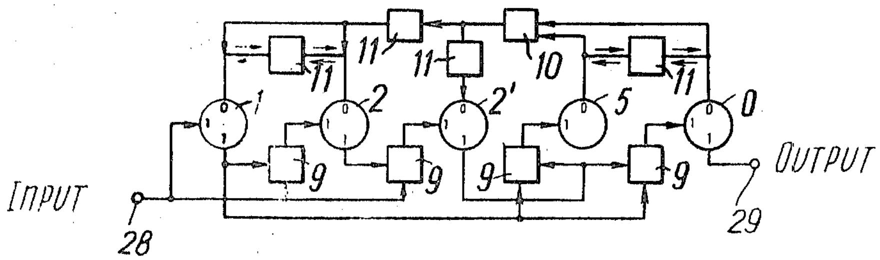
FIG. 4 is a block diagram of a five-stage decimal counter provided in accordance with another embodiment of the invention.

The proposed circuits of the decade counters are characterized in that for reducing the number of tubes to five the extinction of the first tubes is provided from the terminal trigger while the sequence of operation of the tubes is determined by logical coincidence circuits 9 (FIG. 4). To accomplish the extinction of the first tubes, they are connected with diodes to an extinguishing circuit, common for the whole decade, of the terminal two-tube trigger. In a nondiode design the counter is characterized in that the first tubes are fed from the load resistor of the terminal stages with the purposes to extinguish the first tubes after each fifth pulse.

A specific feature of the logical circuit (FIG. 4) is to provide the extinction of the tubes not during the operation of said trigger circuit which requires some additional extinguishing tubes, but during the operation of the following trigger circuits. All the tubes are extinguished by this technique with the exception of the case when the maximum number is set up. After setting up nine pulses the extinction of the tubes is carried out by zero tube 0 which is simultaneously the output one. Three preceeding zero tubes are not operative, and this gives the possibility of reducing the number of tubes in the decade to five.

Figure 6:
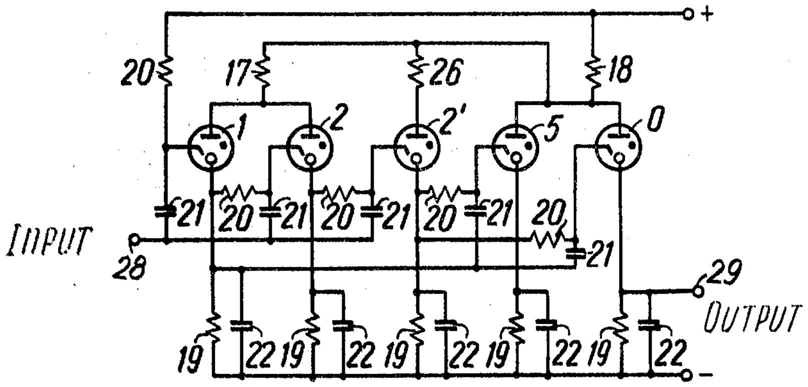
FIG. 6 is another version of the electric circuit diagram of the five-stage decimal counter of FIG. 4.
Figure 5:
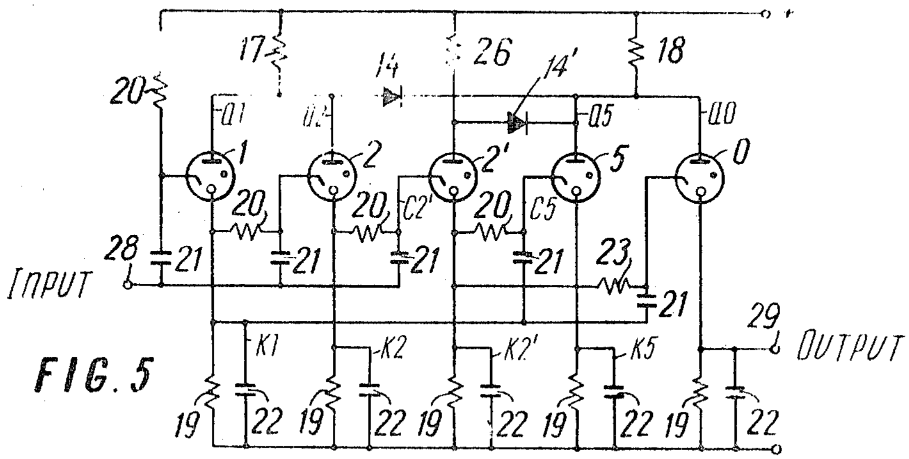
FIG. 5 is an electric circuit diagram of the five-stage decimal counter of FIG. 4.
Figure 7:
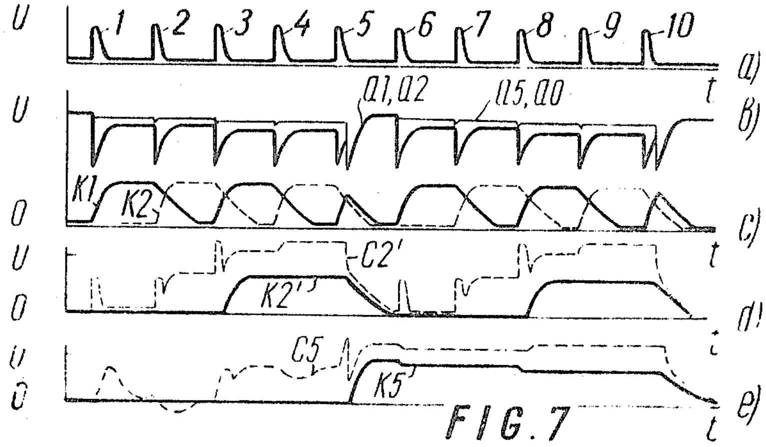
FIG. 7 illustrates potential oscillograms at the main points of the circuit diagrams of FIGS. 5 and 6 which explain the counter operation.

The sequence of the operation of the tubes is determined by coincidence circuits 9 (FIG. 4) the operation of which is based on employing the operating thresholds of the tubes in the counters of FIGS. 5 and 6. The preparing voltage is fed from the corresponding trigger circuit, said voltage being summed with the initiating pulse voltage. In case said voltages coincide, the grid voltage exceeds the ignition voltage and the tube operates. Operation of the five-stage counting decade will be apparent from the voltage waveforms taken at the main points of both decades and shown in FIG. 7, wherein:

a. is an oscillogram of the input pulses;
b. are voltage oscillograms at anodes $a$0, $a$1, $a$2, $a$5 of tubes 1, 2, 5, 0;
c. are voltage oscillograms at cathodes $k$1 and $k$2 of tubes 1 and 2;
d. are voltage oscillograms at grid $c$2[1] and at cathode $k$2[1] of tube 2[1];
e. are oscillograms at grids $c$5 and $c$0 and at cathodes $k$5 and $k$0 of tubes 5 and 0.

In the initial state only tube 0 fires. Prepared tube 1 is always ignited from the first input pulse. Tube 1 is extinguished when tube 2 operates from the second pulse. The third input pulse ignites tubes 1 and 2, and the fourth pulse ignites tubes 2 and 2[1]. The fifth pulse ignites tube 1 from which tube 5 operates and in this case immediately extinguishes all the preceeding tubes due to the anode circuit coupling.

The following five input pulses repeat this cycle with the only difference that input tube 0 operates from the tenth pulse.

In the circuit of FIG. 5, extinction of the preceeding trigger circuits is provided through diodes 14 and 14[1]. In this circuit it is necessary that the voltage at the anodes of the first three extinguishing tubes be less than the voltage at the anodes of the last ones. Otherwise the open diodes will prematurely disrupt the discharge in the first tubes.

In the circuit of FIG. 6, these diodes are removed due to feeding the preceeding triggers from anode resistor 18 of the terminal trigger. In this case, the first three tubes should consume less current than the terminal ones as it is necessary that the anode current in the terminal tubes should not discontinue at the moment of a simultaneous discharge of cathode capacitors 22 of the first two triggers.

As during the operation of the preceeding tubes, the terminal tubes stabilize voltage V$a$ at their anodes, the current passing through each tube of the decade is determined by the difference between its anode voltage V$a$ and the minimum firing voltage V$m$, divided by load resistance R$a$ or R$k$. Taking it into account, the conditions for steady firing of the terminal tubes will be expressed by the equation:

$$\frac{Va-Vm}{Rk5.0}>\frac{Va-Vm}{Ra_1}+\frac{Va-Vm}{Ra_21}$$

or at the close firing voltages of all the tubes these conditions will be expressed by the equation:

$$\frac{1}{Rk5.0}>\frac{1}{Ra_1}+\frac{1}{Ra_2}$$

Here $Rk5.0$ designates the value of cathode resistors 19 of tubes 5 and 0, while $Ra_1$ and $Ra_2$1 designate the values of anode resistors 17 and 26 of tubes 1 and 2.

Thus the steady conditions can be fulfilled, if each cathode resistor 19 ($Rk$5 and $RK$0) of the two terminal tubes is less than the sum of resistors 17 and 26 operating in parallel anode ($Ra$1 and $Ra$2[1]) the value of which determines the maximum amplitude of the current consumed by the first triggers. But, as the duration of the amplitude value of current pulse is much less than the deionization time of the terminal tubes, the cathode resistors of these tubes may be increased compared to the rated value.

A counter with conversion ratio 60 is required for time metering devices wherein 60 seconds are converted into minutes and 60 minutes (+) into hours. This counter with convenient readings may be formed by employing a decimal counter, used for counting unities and a hexadic counter used for counting tens of seconds or minutes.

Figure 8:
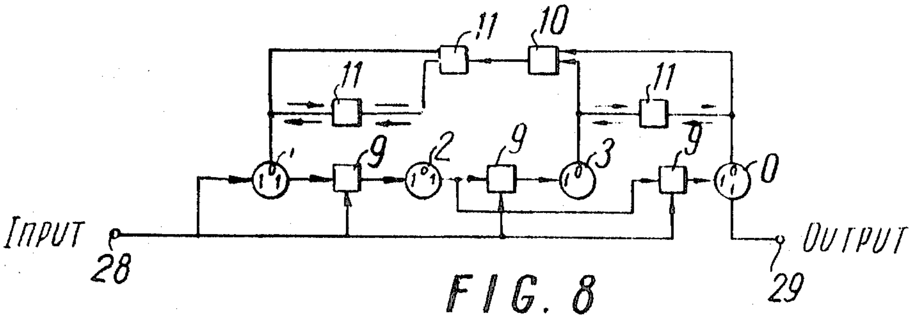
FIG. 8 is a logical block diagram of a hexadic four-stage counter provided in accordance with another embodiment of the invention.
Figure 9:
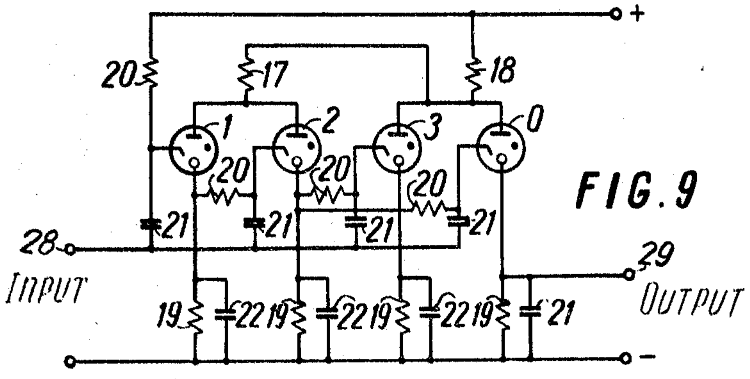
FIG. 9 is an electric circuit diagram of the hexode four-stage counter for time-metering devices.

A hexadic counter may be designed by simplifying the decade, counters described. One of the possible versions of a hexadic counter is shown in FIGS. 8 and 9.

The first pulse causes tube 1 to operate and prepares through circuit 9 tube 2 which operates from the second pulse tube 2 and prepares tube 3 which is ignited from the third pulse and is kept aglow during the reception of the fourth and fifth pulses. Tubes 1 or 2 will be ignited from the fourth and fifth pulses simultaneously with tube 3. The sixth pulse ignites tube 0 which through circuits 11 and 10 extinguishes the previously firing tubes. In this case the circuit is returned to its initial state and a positive pulse is produced at its output.

Tubes employed for all the foregoing counters should withstand without an anode-to-grid breakdown the peak anode voltage increased by the value of the negative spike of the initiating pulse taking place in the tube grid circuits. When these tubes are not available, it is useful to connect diodes instead of the grid resistors to eliminate tube ignition with this negative portion of the initiating pulse or to add resistor 25 (FIG. 3) between each grid and the anode bus bar so that the initial voltage at the grids raise by several tens of volts.

The characteristics of the cold-cathode tubes referred to above are discussed, for example, in Electronics (U.S.A.) No. 7, 1965, wherein are described in operating principles of the tubes and counters.

These counters can employ Soviet-made MTX90 tubes and many other types manufactured today throughout the world. To be operative, multigrid tubes, such as tetrodes require preconditioning current, as described in U.S.S.R. Author's Certificate No. 87,417 (1948) or in the Proceedings of the U.S.S.R. Academy of Science, Vol. 62, No. 2, 1948, and in other texts.

The operation of the type of counter disclosed herein is briefly characterized by the following tables:

1. Operation of the decimal six-element counter illustrated in FIGS. 1 and 2:

1.—OPERATION OF THE DECIMAL 6-ELEMENT COUNTER ILLUSTRATED IN FIGURES 1 AND 2

| | Conditions of six switching elements | | | | | |
|---|---|---|---|---|---|---|
| | 1 | 2 | 4 | 6 | 8 | 0 |
| Count: | | | | | | |
| 0 (10) | 0 | 0 | 0 | 0 | 0 | 1 |
| 1 | 1 | 0 | 0 | 0 | 0 | 1 |
| 2 | 0 | 1 | 0 | 0 | 0 | 0 |
| 3 | 1 | 1 | 0 | 0 | 0 | 0 |
| 4 | 0 | 0 | 1 | 0 | 0 | 0 |
| 5 | 1 | 0 | 1 | 0 | 0 | 0 |
| 6 | 0 | 0 | 0 | 1 | 0 | 0 |
| 7 | 1 | 0 | 0 | 1 | 0 | 0 |
| 8 | 0 | 0 | 0 | 0 | 1 | 0 |
| 9 | 1 | 0 | 0 | 0 | 1 | 0 |

2.—OPERATION OF THE DECIMAL 5-ELEMENT COUNTERS ILLUSTRATED IN FIGURES 4, 5 AND 6

| | Conditions of five switching elements | | | | |
|---|---|---|---|---|---|
| | 1 | 2 | 2[1] | 5 | 0 |
| Count: | | | | | |
| 0(10) | 0 | 0 | 0 | 0 | 1 |
| 1 | 1 | 0 | 0 | 0 | 1 |
| 2 | 0 | 1 | 0 | 0 | 1 |
| 3 | 1 | 0 | 1 | 0 | 1 |
| 4 | 0 | 1 | 1 | 0 | 1 |
| 5 | 0 | 0 | 0 | 1 | 0 |

2.—OPERATION OF THE DECIMAL 5-ELEMENT COUNTERS ILLUSTRATED IN FIGURES 4, 5, AND 6—CONTINUED

| | Conditions of five switching elements | | | | |
|---|---|---|---|---|---|
| | 1 | 2 | 2' | 5 | 0 |
| 6 | 1 | 0 | 0 | 1 | 0 |
| 7 | 0 | 1 | 0 | 1 | 0 |
| 8 | 1 | 0 | 1 | 1 | 0 |
| 9 | 0 | 1 | 1 | 1 | 0 |

3.—OPERATION OF HEXADIC 4-ELEMENT COUNTER ILLUSTRATED IN FIGURES 8 AND 9

| | Conditions of four switching elements | | | |
|---|---|---|---|---|
| | 1 | 2 | 3 | 0 |
| Count: | | | | |
| 0(6) | 0 | 0 | 0 | 1 |
| 1 | 1 | 0 | 0 | 1 |
| 2 | 0 | 1 | 0 | 1 |
| 3 | 0 | 0 | 1 | 0 |
| 4 | 1 | 0 | 1 | 0 |
| 5 | 0 | 1 | 1 | 0 |

I claim as my invention:

1. An electronic pulse counter comprising an input means and a plurality of bistable switching elements, said plurality of bistable switching elements forming a sequence of stages providing an output and having two steady states, one of said two steady states being an initial zero state, a plurality of coincidence circuits, each of said plurality of coincidence circuits being connected between different stages of said sequence of stages, said input means being directly connected to a first stage of said sequence of stages, a unidirectional feedback circuit, means to combine said outputs of said stages and to connect said outputs through said unidirectional feedback circuit to said stages for returning said stages to said initial zero state.

2. A counter as claimed in claim 1, wherein said switching elements are cold-cathode tubes.

3. A counter as set forth in claim 1, wherein a ring counter is formed of said sequence of stages except said first stage, one of said plurality of said coincidence circuits being connected between the output of said first stage and said ring counter, said unidirectional feedback circuit being provided with a diode, means to connect each of the outputs of said stages of said ring counter through said unidirectional feedback circuit and said diode to said first stage returning said first stage to said initial zero state.

4. A counter as claimed in claim 3, wherein said switching elements are cold-cathode tubes.

5. A pulse counter comprising input means for the supply of initiating pulses, output means, switching elements forming a sequence of stages between said input and output means, and having two steady states one of which is an initial state, said stages including inputs connected in a ring exclusive of the input of the first of said stages, said stages further including outputs, said stages having varying degrees of sensitivity to said initiating pulses, said elements being capable of changing states coincidence circuit means connected between the input means and the inputs connected in said ring, the first stage controlling said coincidence circuit means, means to derive an input pulse from said ring and reverse the polarity thereof, a controlling feedback circuit from the output to the input means through which the pulse of reverse polarity from the ring provides automatic control of duration of the initiating pulses when each said stage operates according to the sensitivity of this stage, one-way feedback means between said stages for returning said stages to the initial state and including a diode, connecting the inputs of all stages, except the first one, to the input of said first stage.

6. A counter as claimed in claim 5, wherein said switching elements are cold-cathode tubes.

7. A pulse counter comprising input and output means, switching elements forming a sequence of five stages for decimal conversion and having two steady states, said stages including inputs and outputs and having individual characteristic sensitivities, said elements being capable of changing states, a controlling feedback circuit from the outputs of said stages to the input means, means to derive from said feedback circuit an input pulse and to convert the same into a pulse of reverse polarity to provide automatic control of duration of the initiating pulses for each stage according to the sensitivity of this stage, said input means being directly connected to the first of the stages, said input means being connected to the second and third of said stages through said coincidence circuits individually controlled by the preceding of said stages, the inputs of the fourth and fifth of said stages being connected to the output of the first stage through selected ones of said coincidence circuits which are coupled to and controlled by the third stage, load resistors, said stages further including further inputs, the outputs of the fourth and fifth stages being connected through one of said load resistors to the further inputs of the first and second stages and also through another of said load resistors to the further input of the third stage.

8. A counter as claimed in claim 7, wherein said switching elements are cold-cathode tubes.

9. A pulse counter comprising input means for receiving input pulses, switching elements forming a sequence of five stages for decimal conversion and having two steady states, said stages including inputs and outputs and having individual characteristics sensitivities, coincidence circuits coupled to and controlling said elements, a controlling feedback circuit coupling the outputs of said stages to the input means, means for deriving from an input pulse a pulse of reverse polarity to provide automatic control of duration of initiating pulses for each stage according to the sensitivity of such stage, the input means being directly connected to the first stage and being connected to the second and third of said stages through selected ones of said coincidence circuits which are coupled to and independently controlled by preceding of the stages, the inputs of the fourth and fifth of said stages being connected to the output of the first stage through selected ones of said coincidence circuits which are coupled to and controlled by the third stage, said stages also including further inputs, and a plurality of diodes, the outputs of the fourth and the fifth of the stages being connected through selected ones of said diodes to the further inputs of the first and second stages and through another of said diodes to the further input of the third stage.

10. A counter as claimed in claim 9, wherein said switching elements are cold-cathode tubes.

11. A pulse counter comprising input means for the supply of input pulses, switching elements forming a sequence of four stages for decimal conversion and having two steady states, said stages including inputs and outputs and having individual characteristic sensitivities, coincidence circuits coupled to and controlling said elements, a controlling feedback circuit connecting the outputs of said stages to the input means, means for deriving from an input pulse a pulse of reverse polarity to provide an automatic control of duration of the initiating pulses for each stage according to the sensitivity of such stage, the input of the second of the stages being connected through one of said coincidence circuits to the output of the first of the stages and to said input means, the inputs of the third and fourth of the stages being connected through said coincidence circuits to the input of the second stage and to the input means, said stages also including further inputs, and a plurality of invertors, the further, input of the first stage being connected through one of said invertors to the outputs of the second, third, and fourth stages and the further inputs and the outputs of the third and fourth stages being coupled with each other.

12. A counter as claimed in claim 11, wherein said switching elements are cold-cathode tubes.

13. A counter as set forth in claim 1, including a common input bus bar, said input means being connected to said common input bus bar and providing pulses having a predetermined duration, an additional feedback means, said additional feedback means being connected between said means to combine said outputs of said stages and said input bus bar for automatically adjusting said duration of said pulses.